United States Patent [19]

Devine

[11] Patent Number: 5,966,124

[45] Date of Patent: Oct. 12, 1999

[54] METHOD FOR ADJUSTING IMAGE GEOMETRY IN A VIDEO DISPLAY MONITOR

[75] Inventor: Jesse Devine, Sunnyvale, Calif.

[73] Assignee: Apple Computer, Inc., Cupertino, Calif.

[21] Appl. No.: 08/994,845

[22] Filed: Dec. 19, 1997

[51] Int. Cl.[6] ..................................................... G06F 15/00
[52] U.S. Cl. .............................. 345/339; 345/336; 345/10
[58] Field of Search ........................... 345/326, 327–328, 345/339, 333–335, 340, 341, 342, 343, 331–332, 329, 336–338, 358, 347–349, 344, 352–355, 345–346, 356–357, 157–158, 121, 10–11, 30, 145–146

[56] References Cited

U.S. PATENT DOCUMENTS

| | | | |
|---|---|---|---|
| 5,355,443 | 10/1994 | King et al. | 345/326 |
| 5,384,910 | 1/1995 | Torres | 345/340 |
| 5,682,529 | 10/1997 | Hendry et al. | 345/342 |
| 5,715,515 | 2/1998 | Akins, III et al. | 455/4.1 |
| 5,742,779 | 4/1998 | Steele et al. | 345/349 |
| 5,815,168 | 9/1998 | May | 345/516 |

*Primary Examiner*—Steven P. Sax
*Attorney, Agent, or Firm*—Carr & Ferrell LLP

[57] ABSTRACT

A method for adjusting image geometry in a system having a video display monitor, an input device and an input device pointer visually representing the position of the input device on the video display monitor comprises the steps of generating an image geometry adjustment screen, hiding the input device pointer and generating a simulated input device pointer, using positional information received to accordingly adjust the image geometry, and restoring the input device pointer to the image geometry adjustment screen.

17 Claims, 7 Drawing Sheets

METHOD FOR ADJUSTING IMAGE GEOMETRY IN A VIDEO DISPLAY MONITOR

BACKGROUND OF THE INVENTION

1. Field of the Invention

The present invention relates generally to video display monitors and more particularly to a method for adjusting image geometry in a video display monitor.

2. Description of the Background Art

The display of high quality images is a primary concern of manufacturers, developers and users of video display monitors. Over the operational lifetime of a video display monitor, it may become desirable or necessary from time to time to make adjustments to the geometry of the image displayed by the monitor. Such adjustments may be required to compensate for a degradation or drift in the performance of monitor components. Alternatively, geometry adjustments may be effected to accommodate the individual preferences of the user. Geometry adjustments may also be made to compensate for variations in the direction and magnitude of the local ambient magnetic field, which depends upon, among other factors, the geographical location at which the monitor is being used.

With reference to FIG. 1, there is depicted a cathode ray tube (CRT) video display monitor 10 of a type commonly used in connection with computer systems. The monitor 10 includes a transparent screen 12 having an inner surface that is covered with a phosphor coating 14. An electron gun 16 is configured to emit a beam of electrons 18 directed toward the screen 12. At least one magnetic coil 20 continuously redirects the path of electron beam 18 such that the locations at which electrons impinge on the phosphor coating 14 (which emits light in response to such impingement) is controlled and the desired image is produced on the screen. The display monitor 10 may include an aperture grill 22 which selectively directs electrons to red, green and blue light emitting phosphors to thereby produce a composite color image.

Adjustment of image geometry in a CRT video display of the foregoing description is generally accomplished by modifying the operation of the magnetic coil 20, which in turn changes the pattern of electron impingement on phosphor coating 14. A known method for adjusting image geometry utilizes positional information received from an input device, such as a mouse or trackball, to modify magnetic coil operation accordingly. The method may typically include the step of generating an image geometry adjustment screen having objects which may be spatially manipulated by the appropriate operation of the input device. The movement of the input device is then used to modify the magnetic deflection operational parameters such that the relevant aspect of the image geometry is adjusted by an amount proportional in some manner to the direction and magnitude of the input device movement. During the spatial manipulation of the geometry adjustment object or indicia and associated adjustment of the screen geometry, the position of the input device is continuously visually represented on the screen at by an input device pointer.

When a user makes adjustments to image geometry according to the above method, the movement of the input device pointer displayed on the monitor and viewed by the user is a combined result of the movement of the input device and of the change in image geometry produced by the input device movement. This may tend to produce an exaggeration or other anomaly of the movement of the input device pointer with respect to the movement of the input device. For example, a small movement of the input device may result in a disproportionately large movement of the input device pointer on the screen. This exaggeration of input device pointer movement will generally be disorienting to the user and will render the task of making precise adjustments of image geometry difficult or impossible. While the perceived exaggeration may be alleviated somewhat by reducing the size of the image adjustment screen, such a reduction will reduce the precision to which geometry adjustment may be performed. Therefore, there remains a need for a method of adjusting screen geometry of a video display monitor which overcomes the above-described problems.

SUMMARY OF THE INVENTION

In accordance with the present invention, a method is disclosed for adjusting image geometry in a system having a video display monitor, an input device, and an input device pointer which represents on the video display monitor the position of the input device.

An initial step in the method includes generating an image geometry adjustment screen. The image geometry adjustment screen is beneficially provided with at least one image geometry adjustment object which may be engaged and spatially manipulated by the user. The image geometry adjustment object may be engaged by aligning the input device pointer and depressing the input device switch. In a preferred embodiment of the method of the present invention, the input device pointer is caused to change from a first appearance to a second appearance when the input device pointer is aligned with the image geometry adjustment object, and from a second appearance to a third appearance when the image geometry adjustment object is engaged.

When the image geometry adjustment object is engaged, a simulated input device pointer, preferably visually identical to the third appearance of the input device pointer, is drawn on the screen coincident with the input device pointer. The input device pointer is then hidden and is invisible to the user while the image geometry adjustment object remains engaged. During the period of engagement, positional information generated by the movement of the input device is used to adjust the image geometry accordingly, as by modifying the operation of the magnetic coil in a CRT monitor. The movement of the simulated input device pointer on the screen results solely from the changing geometry of the screen, and in this manner exaggerated movement of the pointer causing disorientation of the user is avoided.

When the image geometry adjustment object is disengaged, preferably by releasing the input device switch, the input device image pointer is restored, with the image geometry adjusted. The method of the present invention thus effectively enables adjustment of image geometry while avoiding an exaggerated and disorienting movement of the input device pointer during the geometry adjustment operation.

DETAILED DESCRIPTION OF THE PREFERRED EMBODIMENT

The present invention discloses a method for adjusting image geometry in a system having a video display monitor, an input device, and an input device pointer visually representing the position of the input device on the video display monitor. The method generally includes the steps of generating an image geometry adjustment screen on the monitor, hiding the input device pointer and generating a simulated input device pointer, using positional information received from the input device to adjust the image geometry, and restoring the input device pointer to the screen.

Figure 1:
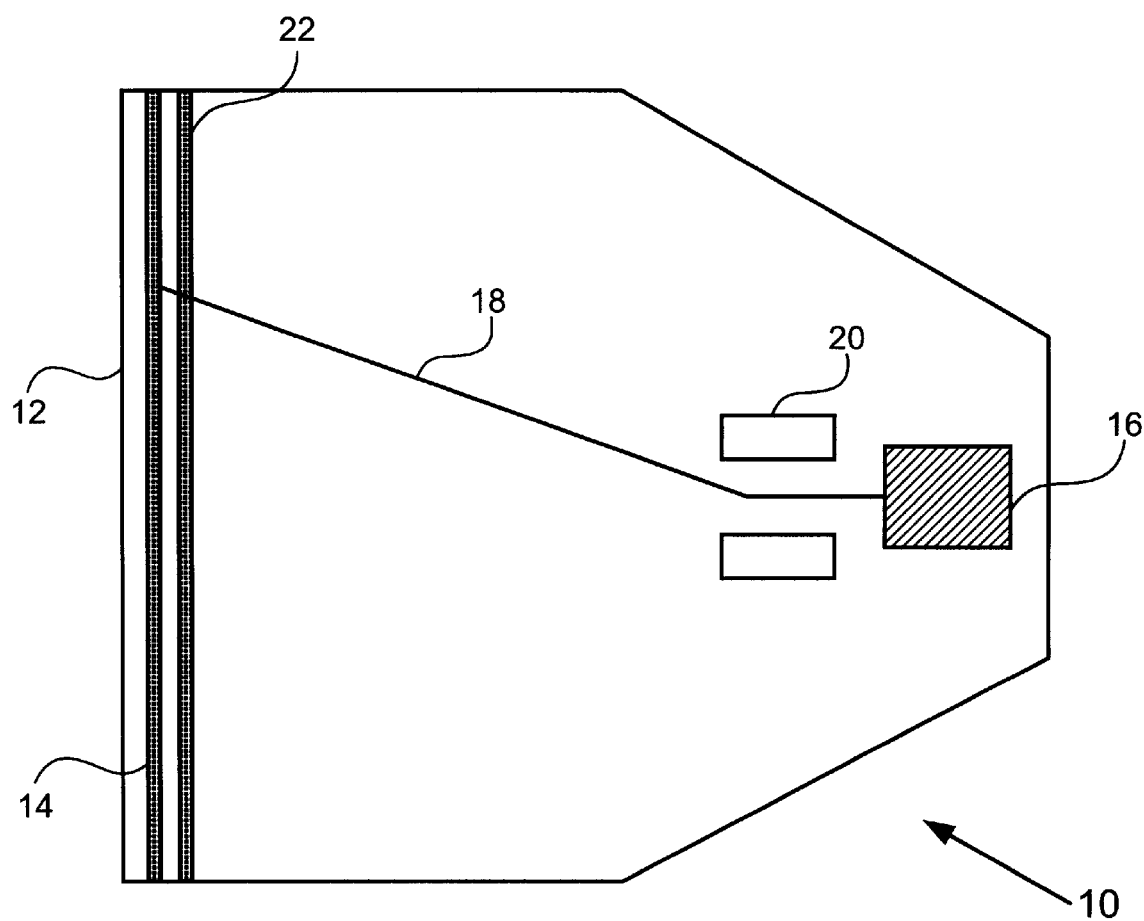
FIG. 1 is a diagram of a CRT video display monitor for use with the present invention.
Figure 2:
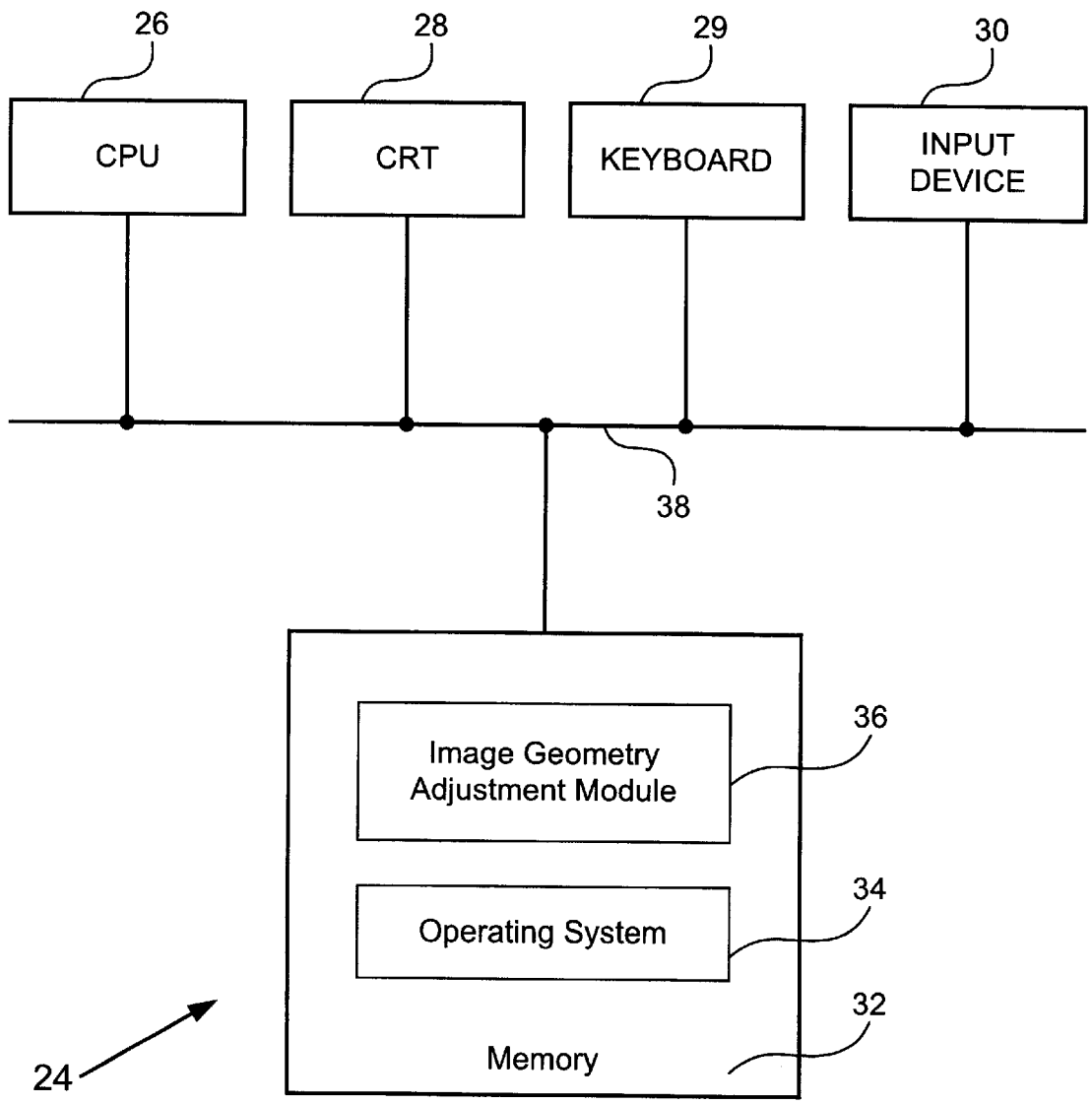
FIG. 2 is a block diagram of a computer system including the CRT video display monitor of FIG. 1 and the image geometry adjustment module of the present invention.

With reference to FIG. 2, a computer system 24 for implementing the image geometry adjustment method of the present invention is depicted. Computer system 24 preferably includes a central processing unit (CPU) 26, a video display monitor 28, a keyboard 29, an input device 30 and a memory 32. Memory 32 contains at least an operating system 34 and an image geometry adjustment module 36. In a preferred embodiment, image geometry adjustment module 36 is a software routine that provides a set of instructions to CPU 26 for adjusting the geometry of images presented by monitor 28.

Each component of computer system 24 preferably has an input and an output coupled to a common system bus 38. Memory 32 may alternatively comprise various storage-device configurations, including Random Access Memory (RAM), Read Only Memory (ROM) and non-volatile storage devices such as floppy disks and hard disk drives. System bus 38 may alternatively be connected to a communications interface (not shown) to permit computer system 24 to output information to a computer network.

Input device 30 will preferably comprise a mouse, but may alternatively comprise any device, such as a trackball, touchpad or light pen, that is capable of transmitting positional information. Input device 30 is provided with at least one depressible switch (e.g., a mouse button) or an equivalent structure. Input device 30 may be positioned by translating the device over a supporting surface, as is done with a mouse, or by any other operations appropriate to the particular input device configuration.

Figure 5:
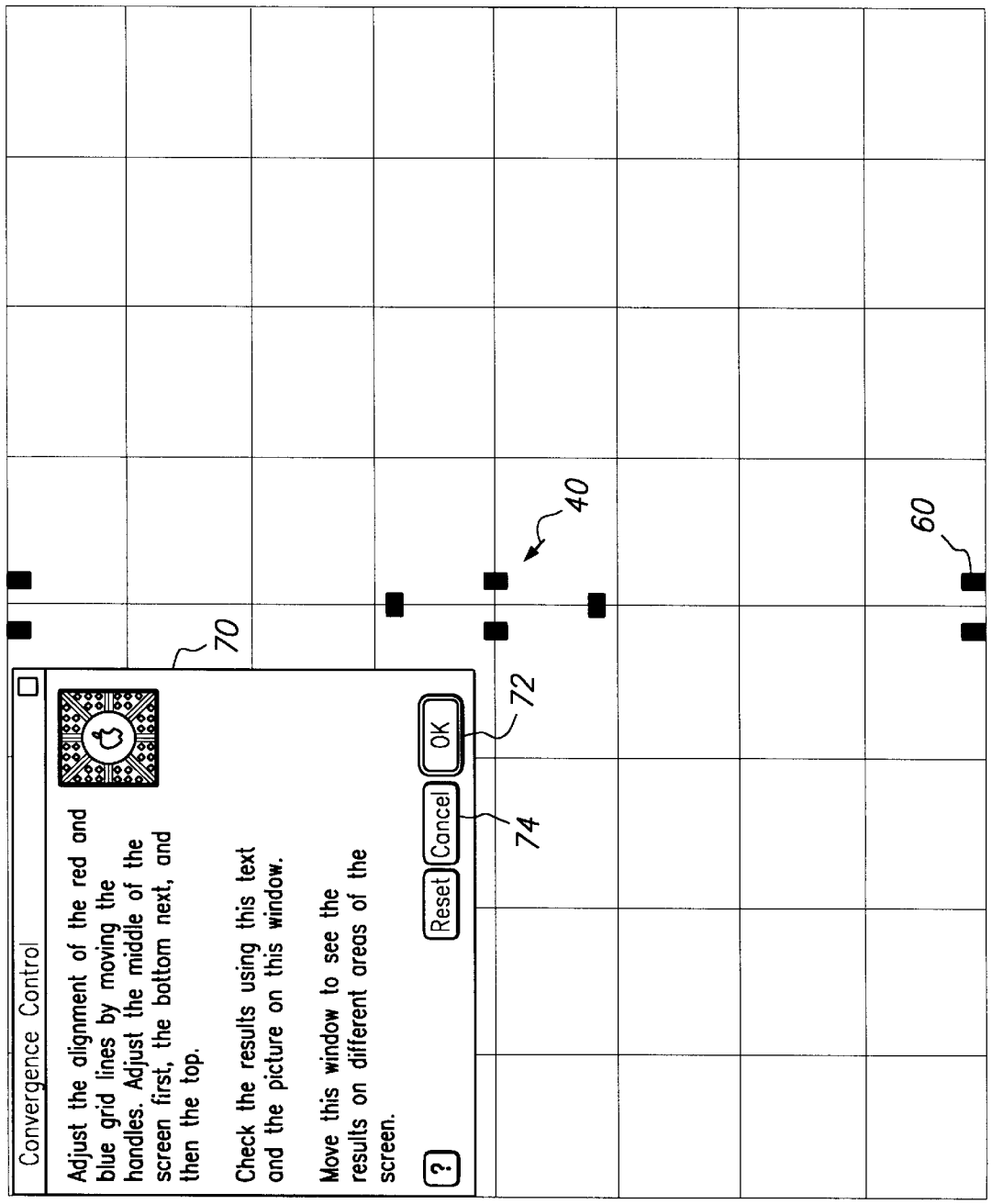
FIG. 5 is an exemplary image geometry adjustment screen in accordance with the present invention.

As is known in the art and commonly employed in connection with computer systems having graphical user interfaces, the position of input device 30 is visually represented on the video display monitor by an input device pointer 40. Input device pointer may take the form of an arrow, as is depicted in FIG. 5, or may alternatively consist of a cursor, icon or other suitable object. Typically, drawing of input device pointer 40 is controlled by operating system 34 which resides in memory 32. By moving input device 30 and thereby causing a corresponding movement of input device pointer 40 on video display monitor 28, the user may identify, select and manipulate text or graphical objects. As is described in more detail below, the appearance of input device pointer 40 may be changed when aligned with certain areas on the screen in order to provide a visual indication to the user that certain actions or operations are available.

Figure 3:
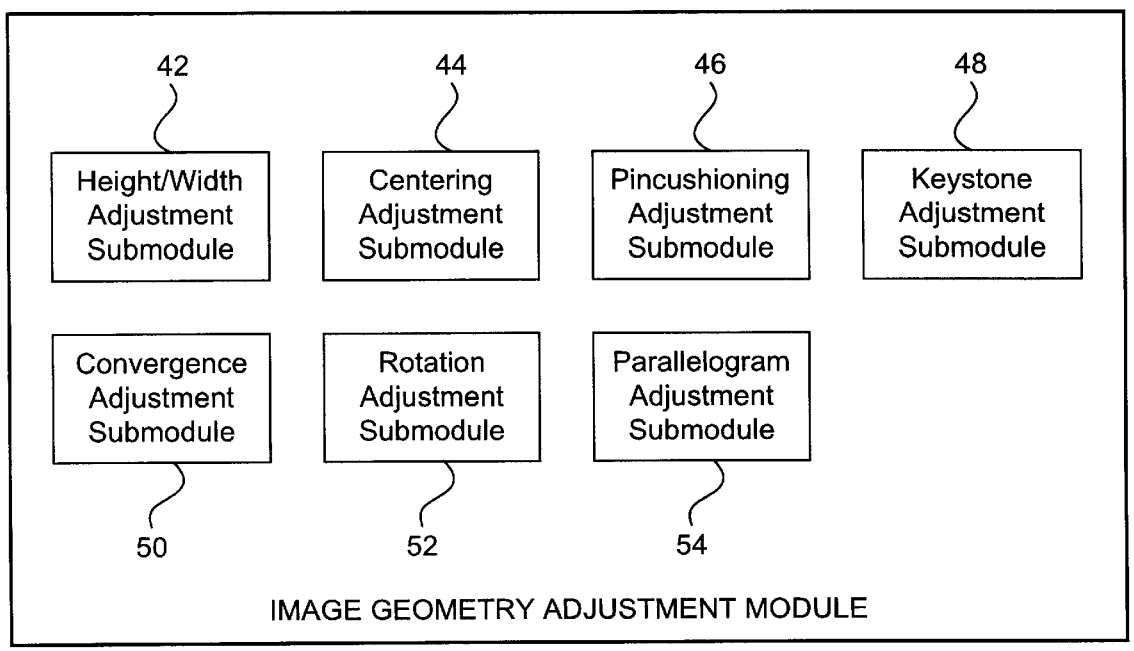
FIG. 3 is a block diagram of one implementation of the image geometry adjustment module.

Referring to FIG. 3, a block diagram of a preferred embodiment of image geometry adjustment module is shown. The image geometry adjustment module 36 preferably comprises a number of submodules 42, 44, 46, 48, 50, 52 and 54. Each of the submodules consists essentially of a software routine for adjusting one or more specific aspects of the displayed image geometry. For example, height/width adjustment submodule 42 adjusts the height and/or width of the image; centering adjustment module 44 adjusts the position of the image; pincushioning adjustment submodule 46 adjusts the alignment of the corners with respect to the midpoints of the side edges of the image, keystone adjustment submodule 48 adjusts the relative lengths of the top and bottom image edges; convergence adjustment submodule 50 adjusts the alignment of the red, green and blue electron beams with respect to each other in a color image; rotation adjustment submodule 52 adjusts the rotation of the image, and; parallelogram adjustment submodule 54 adjusts the angle formed by adjacent sides of the image. It is to be noted that the identities and functions of the submodules shown and described herein are intended to be illustrative rather than limiting.

Figure 4:
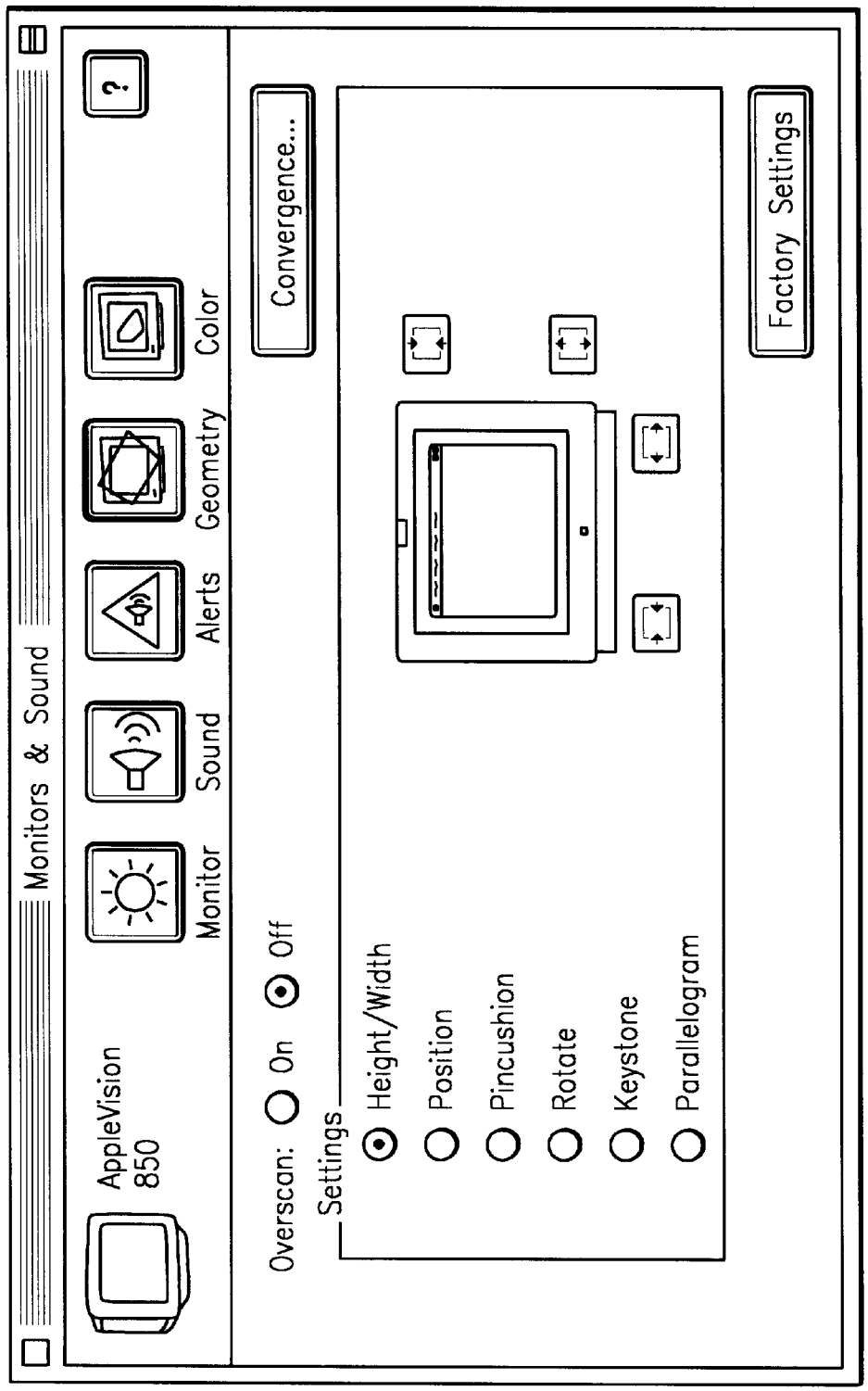
FIG. 4 is an exemplary image geometry submodule selection screen in accordance with the present invention.
Figure 6:
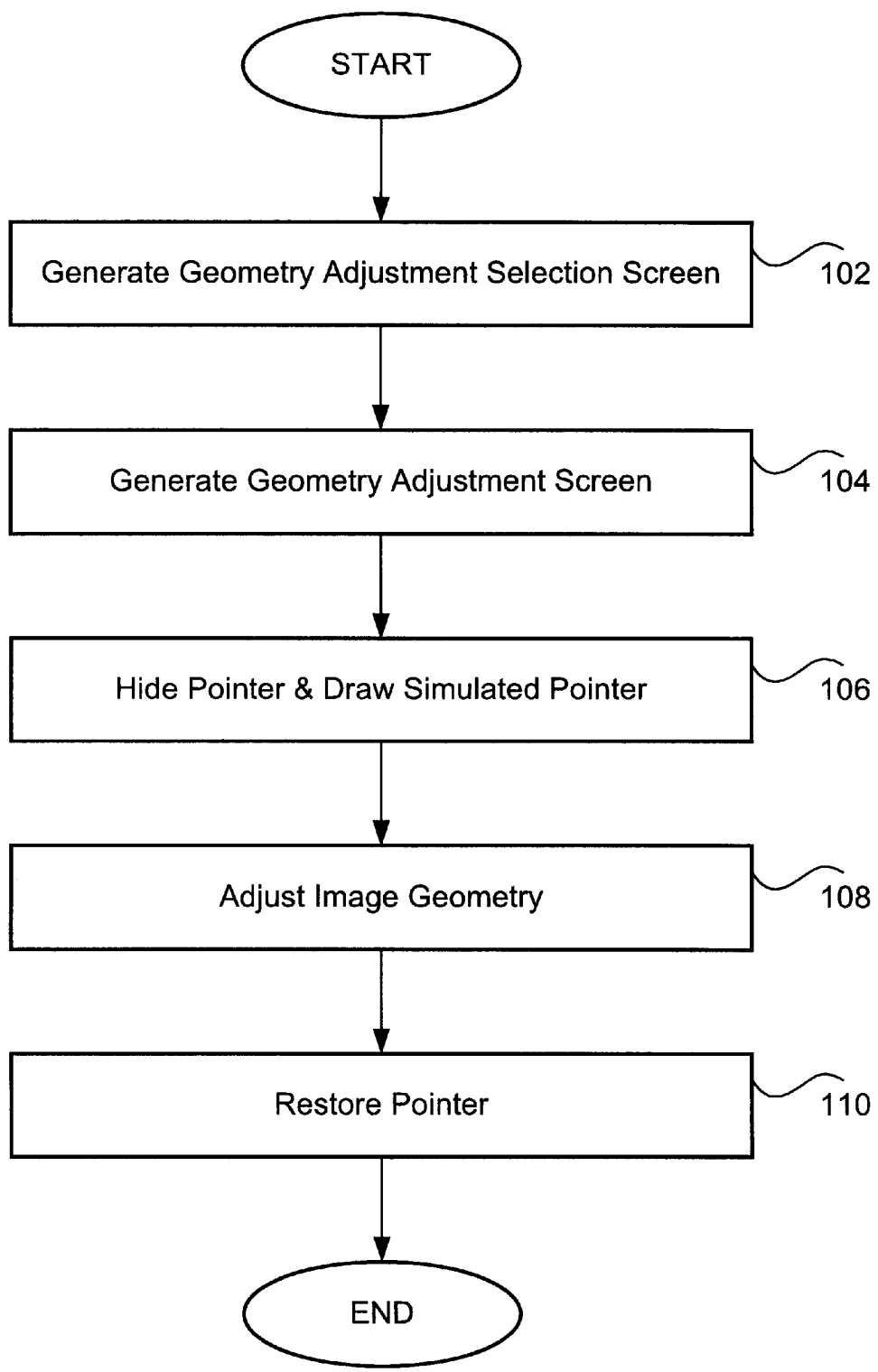
FIG. 6 is a flow chart showing the general method of the present invention.

Referring now to FIG. 6, a flowchart of preferred general process steps for adjusting image geometry is shown. The initial step consists of generating 102 an image geometry submodule selection screen 56 on video display monitor 28 presenting a menu of specific image geometry controls corresponding to the submodules. As may be seen with reference to FIG. 4, the geometry control screen 56 may consist essentially of a textual menu of image geometry controls, or alternatively, the individual geometry controls may be represented by icons having some graphical representation of the aspect of the screen geometry to be adjusted.

Referring again to FIG. 6, image geometry adjustment module 36 next generates 104 an image geometry adjustment screen 58 in accordance with the specific aspect of the geometry to be adjusted. The exact form of image geometry adjustment screen 58 is not of essence to the invention, but the screen includes at least one image geometry adjustment object 60 which is engageable by the appropriate operation of input device 30. Image adjustment object 60 is beneficially located at a position which corresponds to a specific aspect of geometry to be adjusted. For example, image geometry adjustment object 60 may be positioned at the edge of the image for adjustments wherein edge positions are moved (e.g., width/height adjustment), or at the center for adjustments wherein the entire image is displaced (e.g., centering).

Figure 7:
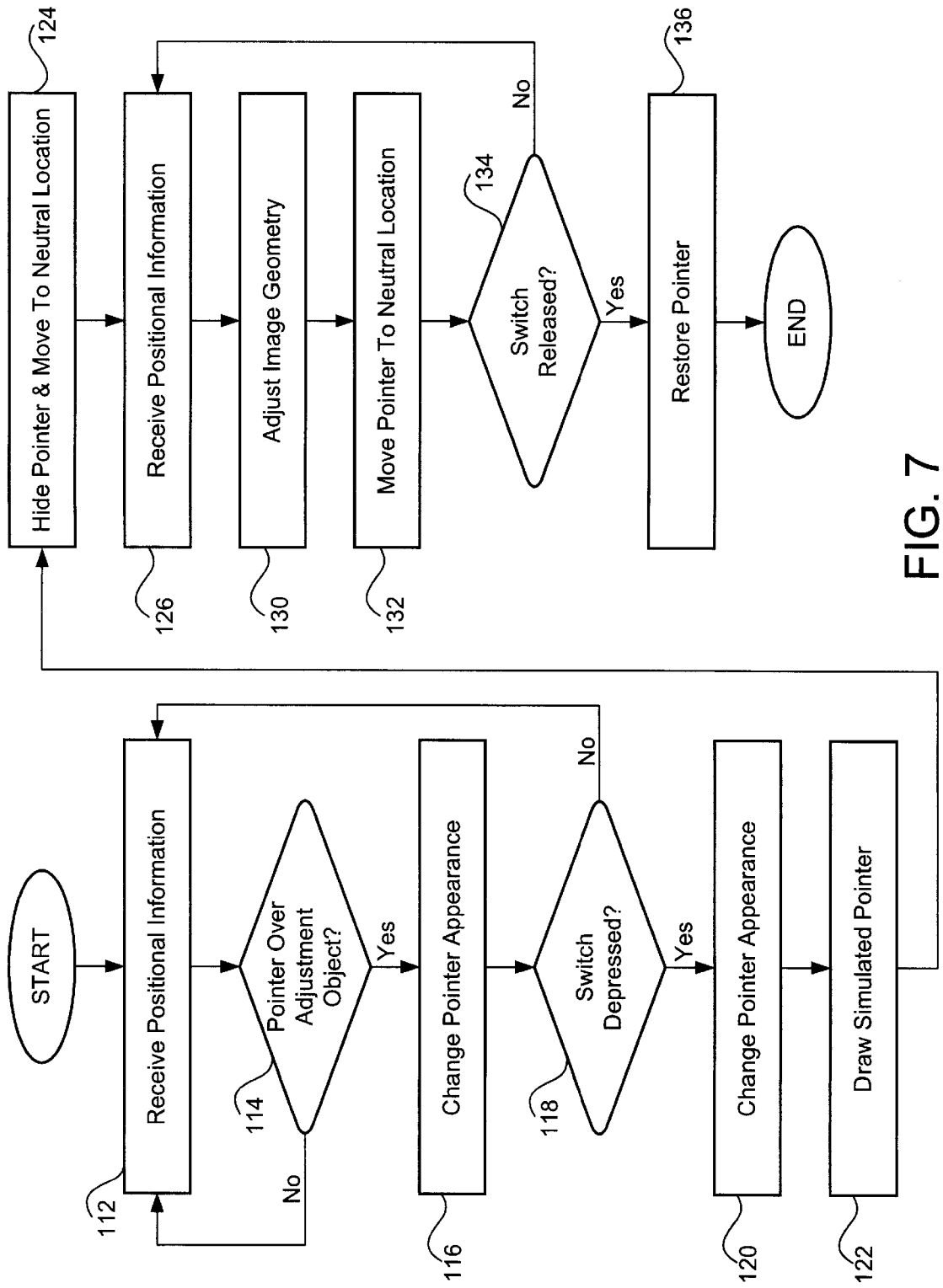
FIG. 7 is a flow chart showing in greater detail the steps of the present invention.

The remaining steps of the present method include hiding 106 input device pointer 40 and drawing in its place a simulated input device pointer; adjusting 108 the image geometry in response to movement of input device 30, and; restoring input device pointer 40 to image geometry adjustment screen 58. These steps may best be understood with reference to FIG. 7, which depicts the method in greater detail. After generating 102 the image geometry adjustment screen 58, image geometry adjustment module 36 next receives 112 and processes positional information transmitted from input device 30 to determine 114 if input device pointer 40 is positioned over image geometry adjustment object 60, i.e., whether input device pointer 40 is aligned with the region of the screen occupied by image geometry adjustment object 60. If it is determined 114 that input device pointer 40 is not aligned with image geometry adjustment object 60, image geometry adjustment module 36 loops back to receive 112 and process the positional information from input device 30.

Assuming that input device pointer 40 is positioned over image geometry adjustment object 60, image geometry adjustment module 36 changes 116 input device pointer 40 from a first appearance to a second appearance. While not a requirement of the present invention, the second appearance of input device pointer 40 is beneficially chosen to suggest to the user that a particular operation is available. In one implementation of the invention, the second appearance of input device pointer 40 comprises a standard open hand symbol indicating that the image geometry adjustment object 60 may be grasped (engaged) and thereafter spatially manipulated.

If input device pointer 40 is aligned with image geometry adjustment object 60, the next step of the present method comprises determining 118 whether the input device switch has been depressed (in a typical system utilizing a mouse as the input device, image geometry adjustment module 36 tests whether the mouse button has been held down). If the input device switch is not depressed, then image geometry adjustment module 36 loops back to the steps of receiving 112 positional information and determining 114 if input device pointer 40 is aligned with image geometry adjustment object 60.

On a determination that the input device switch is depressed, image geometry adjustment module 36 preferably changes 120 input device pointer 40 from a second to a third appearance to thereby indicate that image geometry adjustment object 60 has been engaged. In one implementation of the method of the present invention, the third appearance of input device pointer 40 is a closed hand symbol to suggest to the user that image geometry adjustment object 60 has been grasped.

Immediately after changing 120 the appearance of input device pointer 40, the image geometry adjustment module 36 draws 122 a simulated input device pointer. The simulated input device pointer is disposed coincident with, and has an appearance substantially identical to, the third (closed hand) appearance of the input device pointer 40. In the next step, input device pointer 40 is hidden 124 (made invisible on the image geometry adjustment screen) by image geometry adjustment module 36. Those skilled in the art will recognize that hiding input device pointer 40 is typically accomplished by issuing the appropriate request to operating system 34. It will be understood that the user will not be aware that input device pointer 40 has been removed, since it is replaced by the simulated input device pointer, which is substantially indistinguishable therefrom.

In accordance with the preferred embodiment of the method, the position of input device pointer (which is stored in memory even while the pointer is hidden from view) is next set to a predetermined neutral location, for reasons to be discussed below. The image geometry adjustment module then receives 126 positional information from input device 30, and adjusts image geometry 130 by issuing appropriate adjustment signals to video display monitor. The process of changing the screen geometry responsive to movement of an input device is known in the art and need not be discussed in detail herein. Generally, the displacement of input device pointer 40 from the neutral location is detected by image geometry adjustment module 36, and the displacement used to send appropriate signals (which are related to the magnitude and direction of the detected displacement) to video display monitor 28 such that the desired image geometry adjustment is achieved. In this manner the user-controlled movement of input device 30 is translated into a modification of the geometry of the image presented on video display monitor.

It is essential to the invention that while input device 30 is moved by the user with image geometry adjustment object 60 engaged, the on-screen movement of the simulated input device pointer results solely from the changing geometry of the image. In other words, the simulated input device pointer is static with respect to image geometry adjustment screen 58. In this way, an accelerated or otherwise exaggerated movement of the simulated device pointer, which may disorient the user and interfere with precise adjustment of image geometry, is avoided by the method of the invention.

Next, image geometry adjustment module 36 resets input device pointer, which remains invisible, to the predetermined neutral location. The resetting of input device pointer during each cycle (defined by steps 126, 130, 132 and 134) of geometry adjustment ensures that input device pointer 40 has sufficient room to move without encountering the boundaries of image geometry adjustment screen 58.

The image geometry adjustment module next determines 134 if the input device switch has been released. If the input device switch is still depressed (i.e., the image geometry adjustment object is still engaged), then the FIG. 7 process loops back to receiving 126 positional information from the input device and adjusting image geometry in accordance therewith. On a determination that the input device switch has been released, the image geometry adjustment module restores 136 input device pointer 40 at the position from which it was removed, and the simulated input device pointer is simultaneously removed from image geometry adjustment screen 58 by the image adjustment geometry module.

Referring to FIG. 5, image geometry adjustment screen 58 is preferably provided with an exit event window 70 having a plurality of buttons corresponding to exit options, which may be selected at any time by the user in order to terminate the image geometry adjustment process. The buttons may include an OK button 72 for exiting the image geometry adjustment screen and saving any changes made to the image geometry, and a Cancel button 74 for exiting the image geometry adjustment screen and discarding any changes. The buttons are typically engaged by aligning the input device pointer therewith and momentarily depressing the input device switch.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment and for particular applications, e.g., computer display monitors, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A method for adjusting image geometry in a system having a video display monitor, an input device, and an input device pointer visually representing the position of the input device on the video display monitor, the method comprising the steps of:

generating an image geometry adjustment screen on the video display monitor, the image geometry adjustment screen including at least one image geometry adjustment object engageable by appropriate operation of the input device;

hiding the input device pointer and generating a simulated input device pointer that indicates changing geometry of the image geometry adjustment screen;

receiving positional information from the input device;

using the positional information to adjust the image geometry, whereby the simulated input device pointer is moved accordingly; and restoring the input device pointer on the image geometry adjustment screen.

2. The method of claim 1 wherein the input device has at least one depressible switch, and the at least one image geometry adjustment object is engaged by the steps of:

aligning the input device pointer with the at least one image geometry adjustment object; and depressing the switch.

3. The method of claim 2 further including the steps of:

changing the input device pointer from a first appearance to a second appearance when the input device pointer is aligned with the at least one image geometry adjustment object; and changing the input device pointer from the second appearance to a third appearance when the at least one image geometry adjustment object is engaged.

4. The method of claim 3 wherein the simulated input device pointer is visually identical to the third appearance of the input device pointer.

5. The method of claim 4 wherein the step of hiding the input device pointer and generating a simulated input device pointer includes the steps of:

generating the simulated input device pointer behind the input device pointer;

making the input device pointer invisible;

moving the input device pointer to a neutral location; and repeatedly resetting the input device pointer to the neutral location at predetermined intervals.

6. The method of claim 1 wherein the video display monitor is a cathode ray tube device, and the step of using the positional information to adjust the image geometry includes modifying the operation of at least one magnetic coil of the cathode ray tube device.

7. A computer-readable medium comprising program instructions for adjusting image geometry in a system having a video display monitor, an input device, and an input device pointer visually representing the position of the input device on the video display monitor by performing the steps of:

generating an image geometry adjustment screen on the video display monitor, the image geometry adjustment screen including at least one image geometry adjustment object engageable by appropriate operation of the input device;

hiding the input device pointer and generating a simulated input device pointer that indicates changing geometry of the image geometry adjustment screen;

receiving positional information from the input device;

using the positional information to adjust the image geometry, whereby the simulated input device pointer is moved accordingly; and restoring the input device pointer on the image geometry adjustment screen.

8. The computer-readable medium of claim 7 wherein the input device has at least one depressible switch, and the at least one image geometry adjustment object is engaged by the steps of:

aligning the input device pointer with the at least one image geometry adjustment object; and depressing the switch.

9. The computer-readable medium of claim 8 further including the steps of:

changing the input device pointer from a first appearance to a second appearance when the input device pointer is aligned with the at least one image geometry adjustment object; and changing the input device pointer from the second appearance to a third appearance when the at least one image geometry adjustment object is engaged.

10. The computer-readable medium of claim 9 wherein the simulated input device pointer is visually identical to the third appearance of the input device pointer.

11. The computer-readable medium of claim 10 wherein the step of hiding the input device pointer and generating a simulated input device pointer includes the steps of:

generating the simulated input device pointer behind the input device pointer;

making the input device pointer invisible;

moving the input device pointer to a neutral location; and repeatedly resetting the input device pointer to the neutral location at predetermined intervals.

12. The computer-readable medium of claim 7 wherein the video display monitor is a cathode ray tube device, and the step of using the positional information to adjust the image geometry includes modifying the operation of at least one magnetic coil of the cathode ray tube device.

13. An apparatus for adjusting image geometry in a computer system having a video display monitor and an input device, the apparatus comprising:

a memory;

input device pointer means stored in the memory for generating an input device pointer visually representing the position of the input device on the video display monitor, the image geometry adjustment screen including at least one image geometry adjustment object engageable by appropriate operation of the input device;

image geometry adjustment means stored in the memory, the image geometry means for generating an image geometry adjustment screen on the video display monitor, hiding the input device pointer and generating a simulated input device pointer that indicates changing geometry of the image geometry adjustment screen, receiving positional information from the input device, using the positional information to adjust the image geometry, whereby the simulated input device pointer is moved accordingly, and restoring the input device pointer on the image geometry adjustment screen.

14. The apparatus of claim 13, wherein the video display monitor is a cathode ray tube device, and the image geometry adjustment means is configured to modify the operation of at least one magnetic coil of the cathode ray tube device.

15. The apparatus of claim 14, wherein the input device includes at least one depressible switch, and the at least one image geometry adjustment object is engaged by aligning the input device pointer therewith and depressing the switch.

16. The apparatus of claim 15, wherein the input device pointer changes from a first appearance to a second appearance when the input device pointer is aligned with the image geometry adjustment object, and the input device pointer changes from a second appearance to a third appearance when the image geometry adjustment object is engaged.

17. The apparatus of claim 16, wherein the simulated input device pointer is visually identical to the third appearance of the input device pointer.

* * * * *